Feb. 2, 1932.   A. B. CHRISTENSEN   1,843,803
DRAG SAW
Filed Feb. 28, 1931   5 Sheets-Sheet 4

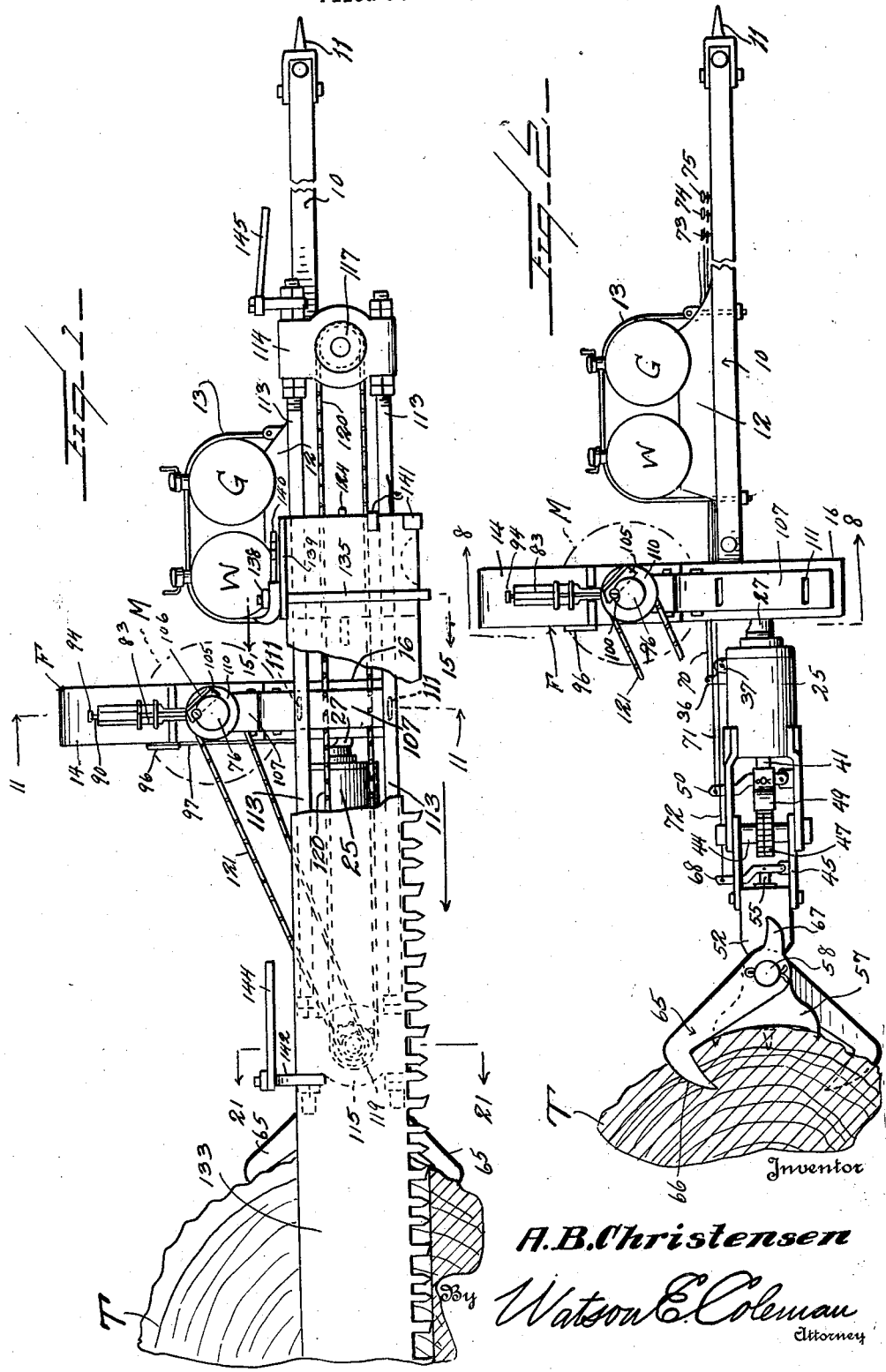

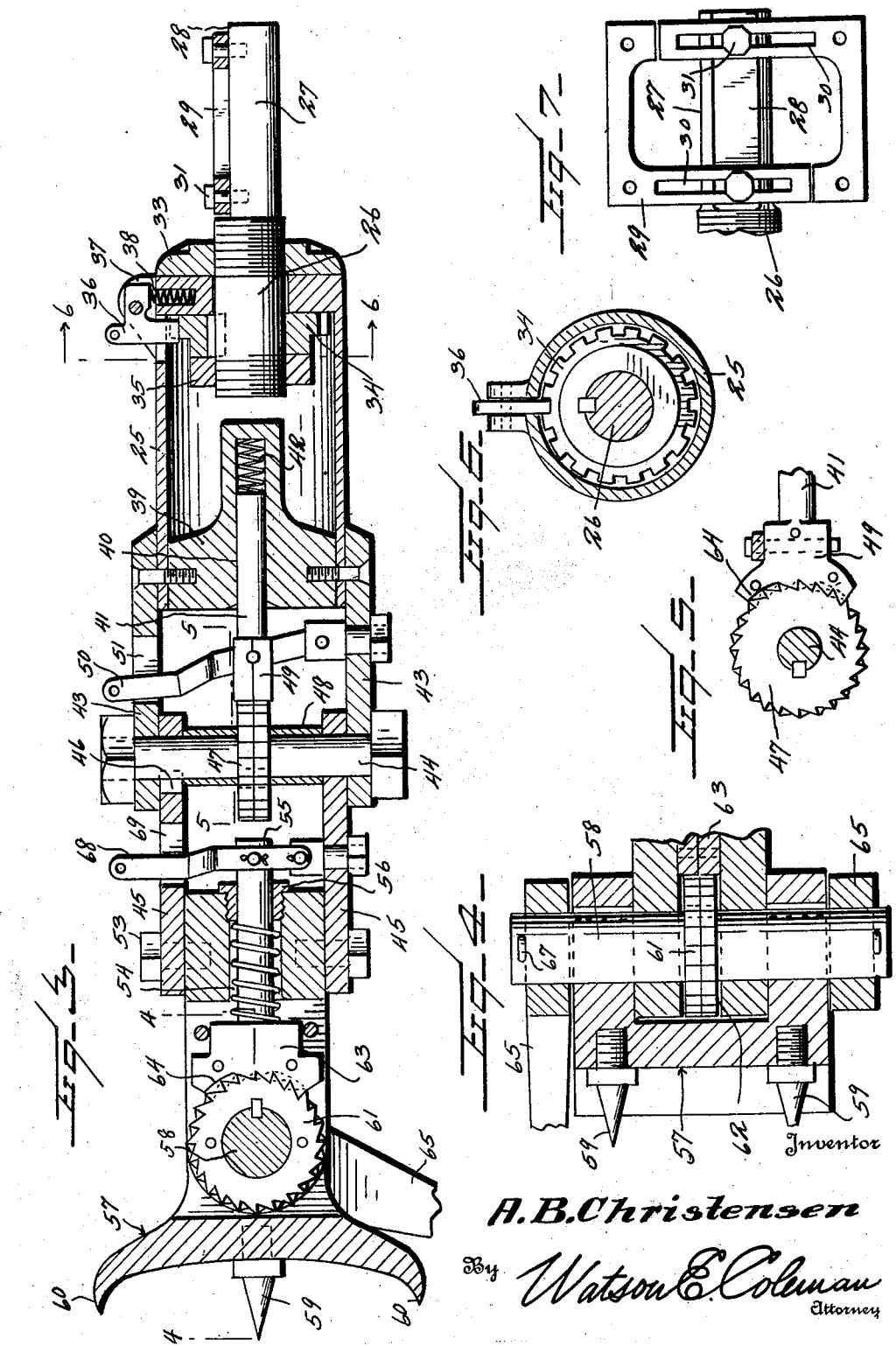

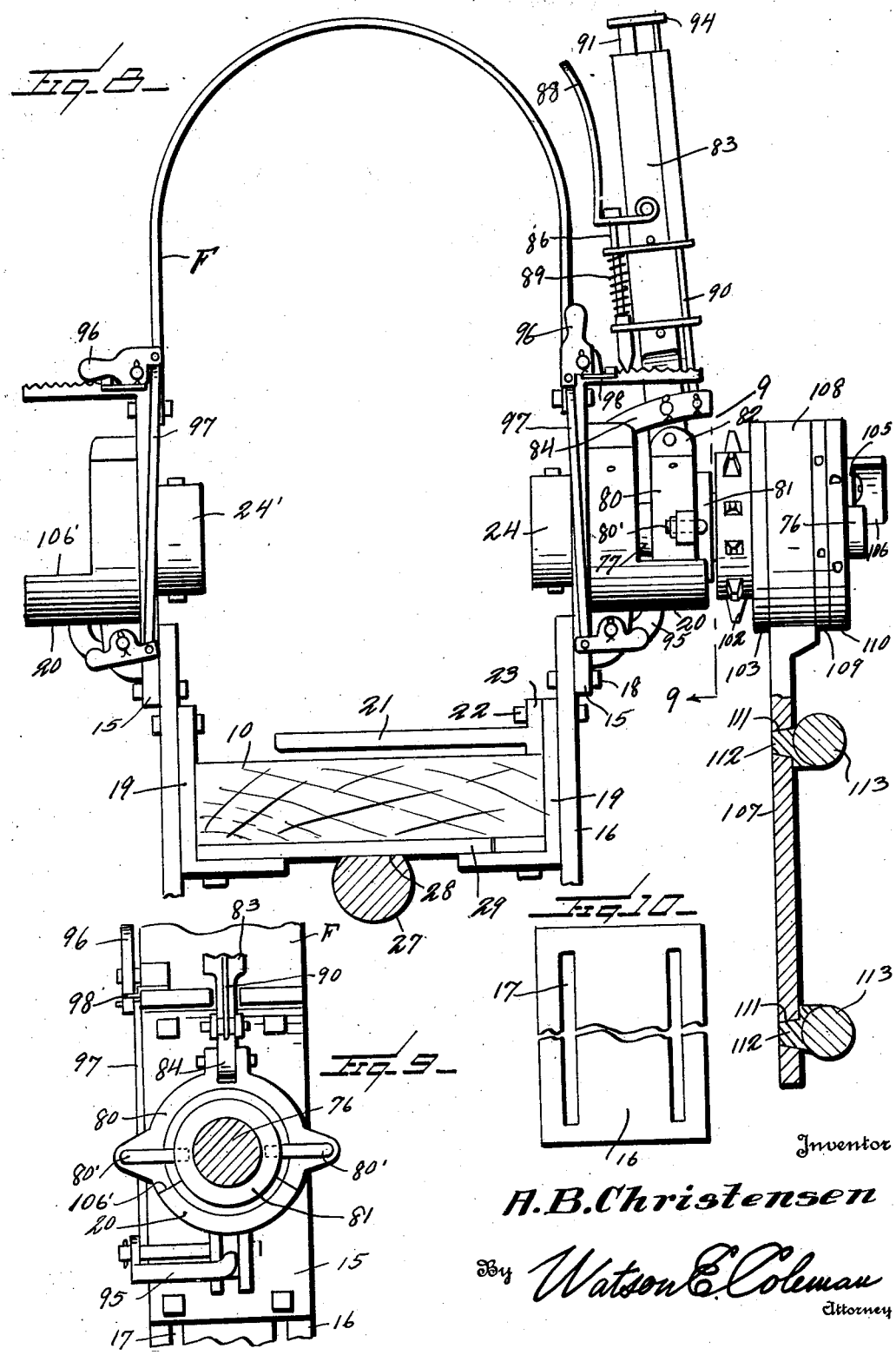

Inventor
A. B. Christensen
By Watson E. Coleman
Attorney

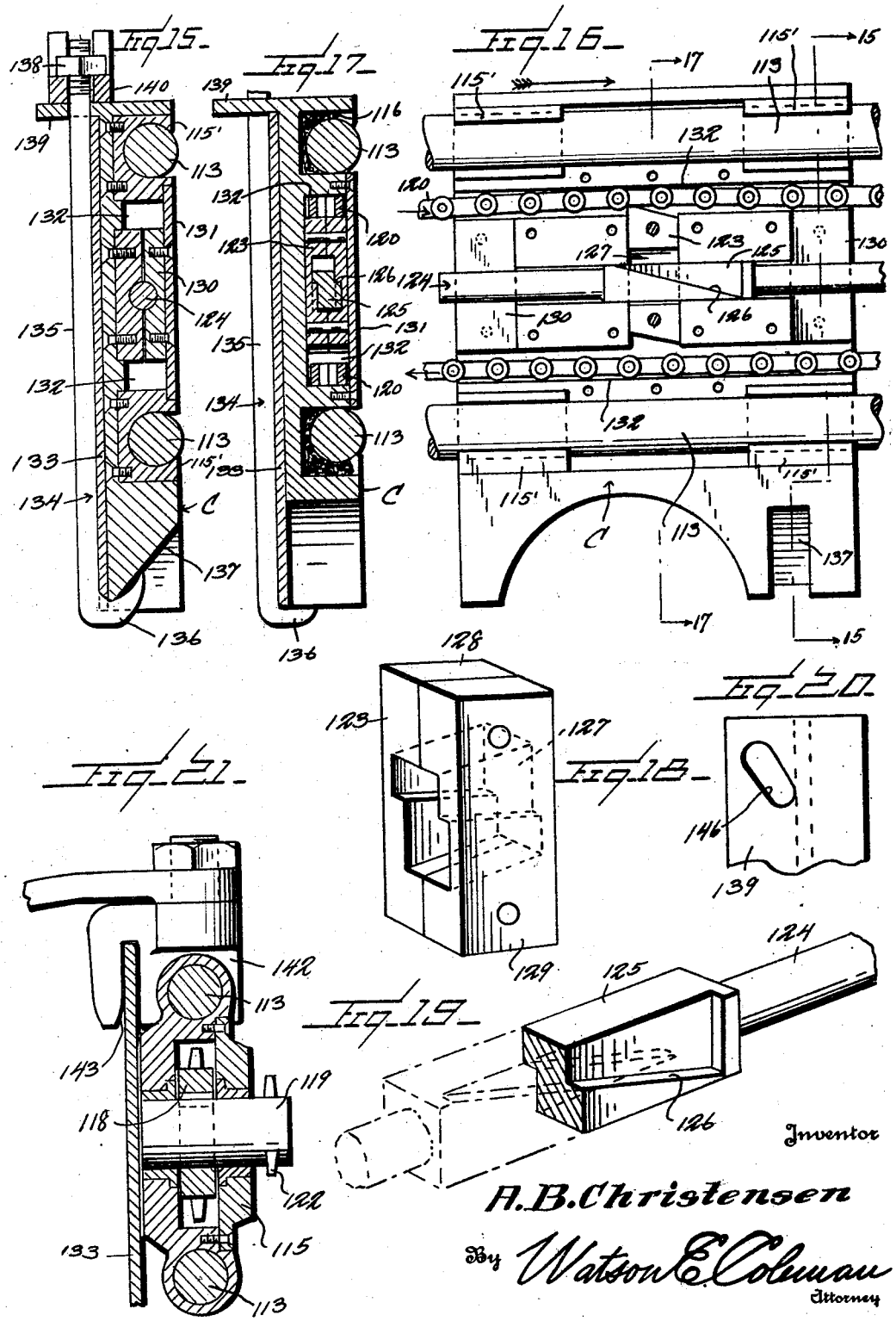

Patented Feb. 2, 1932

1,843,803

UNITED STATES PATENT OFFICE

ALBERT B. CHRISTENSEN, OF EUREKA, CALIFORNIA

DRAG SAW

Application filed February 28, 1931. Serial No. 519,218.

The present invention relates to drag saws and more particularly to a drag saw which is readily assembled or disassembled.

An object of this invention is to provide a drag saw of this kind which is adapted to be supported from the tree or object which it is desired to saw or cut.

Another object of this invention is to provide a drag saw of this kind which is so constructed that it can be adjusted for cutting at various angles, the adjustment being readily accomplished so that the desired cut may be made without undue delay occasioned through adjustment of the saw including the operative parts thereof.

A further object of this invention is to provide a drag saw of this kind which is so constructed that the saw supporting portion may be adjusted to various angles irrespective of the position of the means for holding the support in an elevated position.

A still further object of this invention is to provide a drag saw of this kind which is provided with a novel tripping mechanism whereby the saw may be readily reciprocated and wherein extra pressure may be applied to the saw for faster cutting during the reciprocation thereof.

The above and various other objects and advantages of this invention will in part be described in and in part be understood from the following detailed description of the present preferred embodiment, the same being illustrated in the accompanying drawings, wherein:—

Figure 1 is a detail side elevation of a drag saw constructed according to the preferred embodiment of this invention showing the saw in mounted position on a tree;

Figure 2 is a similar view but having the saw reciprocating means removed from the support;

Figure 3 is a fragmentary longitudinal section of the adjustable means for the support;

Figure 4 is an enlarged sectional view taken on the line 4—4 of Figure 3;

Figure 5 is a fragmentary plan view taken on the line 5—5 of Figure 3;

Figure 6 is a sectional view partly in elevation taken on the line 6—6 of Figure 3;

Figure 7 is a detail side elevation of the adjustable support for the power member attached to the device;

Figure 8 is an enlarged sectional view partly in elevation taken on the line 8—8 of Figure 2;

Figure 9 is an enlarged fragmentary detail elevation partly in section taken on the line 9—9 of Figure 8;

Figure 10 is a fragmentary detail side elevation of the adjustable plate for holding the engine support;

Figure 11 is a sectional view taken on the line 11—11 of Figure 1;

Figure 12 is a fragmentary detail side elevation of the saw supporting member;

Figure 13 is a fragmentary side elevation of the bracket for holding the saw guide;

Figure 14 is a longitudinal sectional view partly in elevation showing a pulley mounted on the power shaft after the saw supporting arm has been removed therefrom;

Figure 15 is an enlarged sectional view taken on the line 15—15 of Figure 1 and on the line 15—15 of Figure 16;

Figure 16 is a fragmentary detail side elevation showing the reversing mechanism for the saw;

Figure 17 is a sectional view taken on the line 17—17 of Figure 16;

Figure 18 is a detail perspective view of the reciprocating dog for engaging the flexible member carried by the saw guide means;

Figure 19 is a fragmentary detail perspective view showing the tripping mechanism for moving the dog shown in Figure 18 into engagement with the flexible member;

Figure 20 is a fragmentary detail top plan view of a portion of the saw supporting frame, and Figure 21 is an enlarged sectional view partly in detail taken on the line 21—21 of Figure 1.

Referring to the drawings wherein like numerals of reference designate corresponding parts throughout the several views, the numeral 10 designates generally a supporting frame or platform comprising an elongated board or plank, wihch is provided in the outer end thereof with caulks 11 which may be used where it is desired to support one end of the member 10 from the ground, or other means, although under ordinary conditions, this member 10 is free at the outer end thereof.

A power member or motor M is secured to the forward end of the supporting member 10, this motor M being removably and reversibly supported upon a frame structure generally designated as F. The motor or power member M may be of any conventional construction such as an internal combustion engine of suitable size.

A water tank W and a gas tank G are mounted on supporting members 12 which are attached to the body member 10 and held in adjusted position by means of a strap or securing member 13. These tanks W and G are connected by suitable pipe lines (not shown) to the motor M.

The frame F comprises a substantially inverted U-shaped upper portion 14 which is secured to a pair of bearing supporting members 15, these members 15 being attached to adjustable side plates 16, which are provided with elongated slots 17 for receiving securing bolts 18. The body member 10 is supported within the frame F by means of a pair of L-shaped supporting members 19 which are vertically adjustable within the slots 17, so that power shaft S of the motor M may be secured concentrically of the bearings 20. The motor M is supported on a motor rest 21 which extends in parallel spaced relation to the upper surface of the supporting beam 10, and this rest 21 is secured to the frame F by means of a bolt 22 which extends through the vertically disposed leg or flange 23 of the rest 21, this leg 23 engaging against one portion of the L-shaped body supporting member 19.

The motor shaft or drive member S is secured at each end to sleeves 24 and 24' which are of identical construction and provided with suitable set screws or the like for attaching the sleeves 24 and 24' to the drive shaft S for rotation therewith. These sleeves 24 and 24' are rotatably mounted in the bearing 20. By providing duplicate sleeve members 24 and 24' within the frame F, the motor M may be reversed or turned around so that the device may be used for other purposes beside the cutting or sawing of trees or logs.

Forwardly of the tail piece or body member 10, there is disposed a housing 25, which at one end thereof loosely receives a shaft 26, this shaft 26 having a reduced outer end portion 27 which is flattened at the upper surface thereof, as at 28. A pair of adjustable L-shaped plate members 29 are secured to the tail piece 10 intermediate the horizontal leg of the L-shaped members 19 and the bottom of the tail piece 10, these plate members 29 having an elongated slot 30 for adjustably receiving bolts 31 so that these plate members 29 may be adjusted laterally with respect to each other so that the bolts 32 used for securing the L-shaped members 19 to the tail piece 10 may be used for securing one leg of the members 29 to the tail piece 10.

A collar 33 is threadly disposed about the shaft 26 outwardly of the housing 25, and a toothed member 34 is secured to the shaft 26 on the interior of the housing 25 and is held against longitudinal movement by means of a nut 35 which is threadably mounted on the inner end of the shaft 26.

A pivoted dog 36 is pivotally mounted on a pair of upstanding ears 37 carried by the housing 25 and is constantly urged into engagement with the teeth of the member 34 by means of an expanding spring 38. In this manner, the tail piece 10 with the members mounted thereupon may be adjusted circumferentially with respect to the housing 25. A block 39 is mounted within the housing 25 oppositely from the shaft 26 and is provided with a bore 40 within which a shaft 41 is slidably mounted, this shaft 41 being constantly urged outwardly of the bore 40 by means of an expanding spring 42 which is mounted within the bore 40 and engages at one end against the inner end of the bore 40 and the other end of the spring 42 engages against the inner end of the shaft 41 so as to constantly urge this shaft outwardly of the block 39. A pair of inwardly extending arms 43 are secured to the housing 25 in spaced relation to each other, in the present instance being secured to the housing 25 which is of substantially cylindrical construction at diametrically opposed points, and a shaft 44 extends between the arms 43. The arms 43 are rotatable with respect to the shaft 44.

A pair of forwardly extending arms 45 are provided adjacent the outer end thereof with suitable apertures for receiving the shaft 44 and are disposed between the arms 43. One of the arms 45 is provided with a suitable keyway and in like manner, the shaft 44 is provided with a complementary keyway for receiving a key 46, so as to hold the shaft 44 against rotation with respect to the arms 45.

A double ratchet 47 is secured to the shaft 44 intermediate the arms 45 and a pair of sleeve members 48 are disposed about the shaft 44 and hold the arms 45 into contact with the inner surface of the arms 43. This ratchet 47 is provided with one portion having the teeth in clockwise position and the opposite or other half of the ratchet is provided with teeth disposed in counter-clockwise position. A longitudinally movable dog 49 is secured to the inner end of the shaft 41 and is provided with suitable toothed portions for engagement with the ratchet 47 so that when the dog 49 is moved inwardly by means of the spring 42, the toothed portion of the dog will engage the teeth of the ratchet 47 and hold the housing 25 against rotation with respect to the dog 49 and the arms 45. A dog releasing lever 50 is pivoted at one end to one of the arms 43 and engages the dog 49 so as to move the dog 49 and the shaft 40 longitudinally of the housing 25. The opposite end of the releasing lever 50 extends outwardly of the arms 43 through a slot or opening 51. A block 52 is disposed between the inner ends of the arms 45 and is held in tight engagement therewith by means of bolts 53 or the like. This block 52 is provided with a bore 54 therethrough which is disposed coaxially with the shaft 40 and a dog shaft 55 is loosely mounted within the bore 54, this bore 54 having a gland 56 threadably mounted in one end thereof and disposed about the shaft 55. A pronged securing member generally designated as 57 is pivotally secured to a shaft 58 which extends through the forward end of the block 52. This pronged securing member 57 is provided with a plurality of prongs or points 59 which are threadably secured therein, and the body of the securing member 57 is extended outwardly so as to provide a pair of inwardly extending prongs 60 secured one at each side of the prongs 59.

A double ratchet 61 is secured to the shaft 58 intermediate the ends thereof, being keyed to the shaft and positioned in the slotted forward end portion 62 of the block 52. A double dog member 63 is secured to the longitudinal movable shaft 55 at the inner end thereof and is provided with teeth for engagement with each toothed portion of the double ratchet 61 so as to hold the ratchet 61 and coactively the shaft 58 against rotation, with respect to the block 52. This shaft 58 is keyed to the outer end portion of the securing member 57 so that the shaft 58 will not rotate with respect to the securing member 57. The teeth on the dog members 49 and 63 are so arranged that the dog members 49 and 63 may be moved longitudinally of the bores 40 and 54, respectively, and into and out of engagement with the double ratchet members 47 and 61, respectively. In order to accomplish this longitudinal movement, one portion 64 of the dog members is blanked or cut out so that the teeth on one side axis of the ratchet members will not engage the teeth of the ratchets. The shaft 58 is positioned at substantially right angles to the longitudinal axis of the shaft 44 so that the housing 25 and the tail piece 10 may be swung vertically or horizontally and held in adjusted position by means of the dogs and ratchets hereinbefore described.

In addition to the pronged securing member 57 which is adapted to engage or project at the inner end thereof into the body of the tree designated T, a pair of hook members 65 are rockably secured at one end to the shaft 58. These hooks or fastening members 65 are provided with a prong 66 at one end thereof, which prong 66 is adapted to project into the body of the tree, as more clearly disclosed in Figure 2.

The opposite ends of the hooks 65 are provided with extensions 67, which extensions 67 facilitate the removal of the hooks 65 from the tree. These extensions 67 may be struck with a hammer or other tool which will rock the hook 65 on the shaft 58 so as to pull the prongs 66 out of the tree. These hooks 65 cooperate with the securing member 57 in holding the tail piece 10 in adjusted position on the body of the tree. It is, of course, understood that this tree portion designated T may be the lower end or stump of the tree where the tree is being felled or where the tree T is a log. The securing hooks 65 may be held on the shaft 58 by means of cotter pins 67 or the like.

A releasing lever 68 is pivoted at one end to one of the arms 45 and is rockably secured intermediate the ends thereof to the outer end of the dog shaft 55, the opposite end of the lever 68 extending through a slot 69 in the opposite arm member 45. When this lever 68 is moved outwardly, the dog 63 is moved out of engagement with the ratchet 61 so as to permit adjustment of the block 52 with respect to the securing member 57.

While I have disclosed the ratchets 47 and 61 as being constructed with reversed teeth, that is, one-half of the ratchet members having teeth extending in a clockwise direction and the other half of the ratchet having teeth extending in a counter-clockwise direction, I do not wish to be limited to this construction as, if desired, other toothed members may be used if found desirable for the purpose.

In order to readily effect the release of the dog members 36, 49 and 63 from a point remote therefrom, I have provided suitable cables or flexible members which are adapted to be attached at one end to the releasing levers, the opposite end being secured on a pin or hook mounted on the tail piece 10. The dog member 36 may be provided with a cord or flexible member 70 and the lever 50 provided with a releasing cord 71, and in like manner, the lever 68 may be provided with a releasing cord 72. The releasing cord 70 may be removably secured at the opposite end to a hook or pin 73, the releasing cord 71 removably secured to a pin or hook 74 and in like manner, the releasing cord 72 removably secured to a pin or hook 75, which pins 73, 74 and 75 are mounted on the tail piece 10 outwardly of the tanks W and G. These cords or flexible members 70, 71 and 72 extend between the motor rest 21 and the upper surface of the tail piece 10, and in like manner, the wires and pipe connections of the motor M with the tanks W and G may be extended beneath this rest 21.

A driven shaft 76 is rotatably mounted in the bearing 20 and extends at one end into the sleeve 24, this inner end 77 being of tapering construction so as to provide a frictional clutch for engagement with a complementary tapering portion in the sleeve 24. The driven shaft 76 is provided intermediate the ends thereof with an annular rib 78, and this rib 78 has a shoulder or annular groove 79 on the inner face thereof, the purpose for which will be hereinafter described.

A split collar or band 80 is disposed about a ring 81, which is loosely mounted about the shaft 76 and engages against the outer face of the rib 78. The band 80 is secured to this collar or ring 81 by means of securing pins 80' which are carried by the band 80 and extend into recesses in the ring 81, and is provided with upstanding ears 82 between which an operating lever 83 is rockably secured. A releasing pawl 84 is rockably mounted on the lever 83 and engages in a recess 85 in the bearing 20. When the lever 83 is moved outwardly at the upper end thereof with respect to the frame F, the collar 80 and the ring 81 will be moved inwardly, this movement coactively moving the driven shaft 76 inwardly into engagement with the collar 24 secured to the drive shaft S. A longitudinally movable pawl 86 is slidably mounted on the lever 83 and engages at the lower end thereof in a toothed rack 87 which is mounted on the frame F. A releasing lever 88 is rockably secured to the lever 83 intermediate the ends thereof and engages the pawl 86 so that the pawl 86 may be moved out of engagement with the toothed rack 87 for rocking of the lever 83. A spring 89 is adapted to constantly urge the pawl 86 into engagement with the rack 87.

A rod 90 is secured at one end to the dog 84 and the rod 90 extends longitudinally of the lever 83, the opposite end extending beyond the end of the rod 83. A pin 91 is slidably mounted in a bore 92 extending downwardly from the upper end of the lever 83 and is constantly urged outwardly by an expanding spring 93.

A connecting plate 94 connects the outer end of this pin 91 with the operating rod 90 so that when the connecting member 94 is moved inwardly, the rod 90 is moved longitudinally of the lever 83 so as to rock the dog 84 out of the recess 85 and permit the driven shaft 76, together with the members attached thereto, and hereinafter described, to be removed from the frame F. A rockable dog 95 is rockably mounted on the frame F and is adapted, when in operative position, to engage in the annular groove or recess 79, so as to hold the driven shaft 76 in inoperative position. An operating lever 96 is mounted on the frame F, and is connected to the dog 95 by means of a connecting link 97 so that when the lever 96 is rocked, the dog 95 will be coactively rocked into operative or inoperative position. A spring 98 is mounted on the frame F and engages the lever 96 so as to hold this lever 96 in either operative or inoperative position.

A sleeve 99 is releasably keyed to the driven shaft 76 by means of a key member 100 which holds the sleeve 99 against circumferential movement with respect to the driven shaft 76. A pin 101 extends through the shaft 76 so as to hold a thrust ring 101' against longitudinal movement on the driven shaft 76. A sprocket member 102 is integrally formed with the inner end of the sleeve 99, and in like manner, a rib 103 is secured or integrally formed with the sleeve 99 at a point outwardly from the sprocket 102. The driven shaft 76 is provided with a slot or opening 104 which extends inwardly from the periphery thereof adjacent the outer end of the shaft 76, and a locking key 105 is pivotally secured to the key 100 and engages in the slot 104 so as to hold the key 100 against longitudinal movement with respect to the driven shaft 76.

This locking member 105 engages at the inner end thereof against the outer end of the sleeve 99 and is provided with an extension 106 for facilitating rocking of the locking member 105 on the key member 100. Each of the bearings 20 is preferably cut away, as at 106', so as to receive the band 80 so that the driven shaft 76, together with the releasing lever 83 may be attached to either end of the motor M. This is of particular advantage where the device is mounted in relatively confined quarters where the operative members for the saw cannot be set into operation from one side of the motor but can be readily secured to the other side of the motor. So far as the operation of the saw is concerned, which operation will be hereinafter described, it is immaterial in which direction the driven shaft S is rotating.

A depending saw guide supporting arm 107 is loosely disposed about the sleeve 99, being provided at the upper end thereof with a ring or bearing member 108 which at one face thereof engages against the rib or shoulder 103, and a nut 109 is threadedly mounted on the sleeve 99 and loosely engages against the outer face of the annular member 108. A lock nut 110 is also threadedly mounted on the sleeve 99 for holding the securing nut 109 against loosening. The hanger 107 is provided with spaced slots 111 for receiving lugs 112 carried by upper and lower guide members 113. These guide members 113 extend horizontally or at right angles with respect to the hanger 107, and one end of the guide rods 113 is secured to an outer housing 114, the rods or guide members 113 being mounted in spaced parallel relation to each other and the opposite end of each of the guides 113 is mounted in an inner housing member 115.

A slidable carriage generally designated as C is slidably mounted on the guides 113, the carriage C being provided with slide members 115' for sliding engagement with the guide members 113. At a point intermediate the ends of the carriage C, there is positioned oil waste 116 or the like, for contact with the guide rods 113 so as to lubricate the rods 113. A sprocket or pulley 117 is rotatably mounted in the housing 114 and in like manner, a sprocket 118 is secured to a rotatable shaft 119 mounted for rotation in the housing 115. An endless flexible member 120 is disposed about the sprockets or pulleys 117 and 118. A second endless flexible member 121 is disposed about the sprocket or pulley 102, and a sprocket 122 which is carried by the shaft 119 at a point outwardly of the housing 115. In this manner, the rotation of the driven shaft 76 and the sprocket 102 will rotate the shaft 119 and in like manner, the flexible member 120 will be rotated about the sprockets or pulleys 117 and 118.

The carriage C is provided with a vertically movable locking dog 123 which is adapted to be slidably disposed within the carriage C. A dog tripping member generally designated as 124 is slidably mounted in the carriage C intermediate the two portions of the flexible member 120 and extends outwardly of each end of the carriage C. This tripping member 124 comprises a central block 125 which is provided at each side thereof with reversely disposed inclined shoulders 126 which engage in complementary openings 127 in the locking member 123. The dog member 123 is provided with oppositely directed locking portions 128, the upper locking portion 128 being oppositely directed from the lower locking portion 129 so that when the dog 123 is moved vertically within the carriage C, the carriage C will be locked to the upper portion of the flexible member 120 and moved outwardly of the housing 115.

The tripping member 124 is slidably mounted in a guide member 130 which is secured to the carriage C, and a cover plate 131 is adapted to protect the guide member 130 and coactively hold the flexible member 120 within the passages 132 provided above and below the guide member 130 for passage of the flexible member 120 through the carriage C. A saw 133 is secured at one end to the carriage C by means of a clamping member generally designated as 134, which clamping member 134 comprises an elongated rod 135 which is provided at the lower end thereof with a hook 136 for engagement with the lower edge of the saw 133, and also for engagement with a diverging slot 137 disposed in the carriage C. The upper end of the rod 135 is threaded and a nut 138 is threadably mounted thereon. The rod 135 at the upper end thereof extends through an outwardly extending flange 139 integrally formed with the carriage C, and a wrench or releasing member 140 is interposed between the nut 138 and the upper face of the flange 139 so as to facilitate the release of the nut 138. The carriage C is also provided at the rear end thereof with securing lugs 141 which engage the end of the saw 133 so as to hold the saw against longitudinal movement. This clamping member 134 holds the saw 133 in tight engagement with the carriage C.

A saw guide 142 which is provided with a slot 143 is secured to the housing 115, the saw slidably engaging in the slot 143 so as to hold the upper edge of the saw 133 in alinement with the carriage C and the guide members 113. A lever 144 is secured to the guide 142, which lever may be grasped in the hand so as to press the saw into the slot cut thereby so as to facilitate the feeding of the saw through the slot which is cut into the tree T.

In like manner, the outer ends of the guide members 113 are provided with a handle 145 which handle may be grasped in the hand so as to rock the hanger 107 and the guide members 113 for rocking movement of the saw 133 where it is desired to either release the saw 133 from the slot cut thereby or to press the saw into the slot for faster cutting. The flange 139 is provided with a elongated slot 146 through which the upper end of the securing member 134 is projected, this slot 146 being angularly disposed with respect to the longitudinal axis of the guide members 113 so that the securing member 134 may be moved away from the outer face of the saw 133 for releasing of the saw without removing the clamp member 134 from the carriage C. Where it is desired to use the device herein disclosed for a rotary saw or the like, a pulley P may be removably secured to the driven shaft 76 in place of the sleeve 99. This pulley P is held on the shaft 76 by means of the key 100 and the locking member 105.

In the operation of this device, the motor M, together with the hanger 107 and the saw and saw guides are temporarily removed from the tail piece 10 until the securing members 57 and 65 have been attached to the trunk of the tree. The block 52 may be so mounted that the shaft 58 is in substantial alinement with the longitudinal axis of the tree T and the housing 25, together with the plates 45, may then be so adjusted by means of the ratchets 47 and 61, respectively, that the tail piece 10 is in the desired position for engagement of the saw 133 with the trunk of the tree. Through the shaft 26, the tail piece 10 may be adjusted at any desired angle laterally with respect to the axis of the tree so that either a lateral cut or an angular undercut may be made in the tree. The flexible members 73, 74 and 75 are pulled outwardly so as to effect the adjustment of the tail piece 10 until it is in the desired location and position whereupon the motor M may be attached to the rest 21 and the hanger 107 slipped onto the driven shaft 76. The clutch lever 83 may then be swung outwardly of the frame F so as to draw the shaft 76 inwardly into engagement with the rotating sleeve 24 or 24', depending of course, upon which side of the frame F it is desired to attach the driven shaft 76. After the motor M has been set into operation, the release lever 88 is pulled inwardly toward the clutch lever 83 so as to permit the inward movement of the shaft 76 for rotation of the driven shaft 76 coactively with the sleeve 24 or 24'. The flexible members 121 and 120 will then be rotated, which movement will reciprocate the carriage C and the saw 123 for cutting of the log or tree. Where the saw 123 is making a vertical cut in a log disposed on the ground, the weight of the saw and the carriage will be sufficient to gravitatingly feed the saw through the log or tree T. Where the saw 123 is making a vertical or angular cut, it can be fed through the tree by means of either of the levers 144 or 145.

It will be obvious from the foregoing that a drag saw has been disclosed which may be readily taken apart or put together again in a relatively short space of time and which may also be transported in disassembled condition to the desired point without the use of trucks or wagons, the parts being readily carried by a person in their disassembled condition.

It is also obvious that the assembled structure may be secured to a log or tree irrespective of the position or inclination of the tree or log, and that where underbrush prevents the positioning of the saw on one side of the tree, the saw may be disposed on the opposite side or in any cleared space.

It is, of course, understood that various changes and modifications may be made in the details of construction and design of the above specifically described embodiment of this invention without departing from the spirit thereof, such changes and modifications being restricted only by the scope of the following claims.

I claim:—

1. In a drag saw of the character described, a frame structure adapted to receive a power member, bearings in said frame, rotatable sleeve members engaging said bearings and said power member and rotatable by said power member, said sleeves having a tapering bore therethrough, a driven shaft having a tapering inner end portion for interchangeable clutching engagement with the tapering bore of one of said sleeves, a clutch lever rockably supported by said driven shaft and engaging said frame, and means for removably mounting said shaft in said frame.

2. In a drag saw construction including a frame and supporting means therefor, a pair of drive members rotatably mounted within said frame, a driven member engaging a selected drive member and removably supported by said frame, a guide member, supporting means for said guide member and supported from said driven member, means for detachably holding said guide supporting means on said driven member a carriage slidably mounted on said guide member, an endless member carried by said guide member and loosely engaging said carriage, means for moving said endless member, and reversing means disposed in said carriage and engaging said flexible member whereby to reverse said carriage on said guide for reciprocation thereof.

3. In a drag saw construction including a frame, a saw operating mechanism and means for attaching one end of the frame on a log, a pair of sleeves disposed within the frame in opposed relation to each other and adapted to be engaged by a power member supported therebetween, and interchangeable coupling means supported by the frame and engaging a selected sleeve whereby to actuate said saw operating mechanism upon rotation of said selected sleeve.

4. In a drag saw construction including a frame and a saw operating mechanism, a drive member supported by the frame, a driven shaft, releasable coupling means for releasably coupling the driven shaft with the driving member, and releasing means whereby to permit removal of the driven shaft from the frame.

5. In a drag saw construction including a frame, a saw carriage supported for reciprocation by the frame, attaching means for attaching the frame to an article to be cut by the saw and substantially universal adjusting means interposed between the frame and the attaching means whereby to permit substantially universal adjustment of the frame with respect to the attaching means, said adjusting means comprising releasable horizontal adjusting means, releasable vertical adjusting means, releasable rotatable adjusting means, and flexible means connected to said horizontal, vertical and rotatable adjusting means whereby to permit adjustment of the frame from a point remote from the adjusting means.

In testimony whereof I hereunto affix my signature.

ALBERT B. CHRISTENSEN.